United States Patent
Leigh et al.

(10) Patent No.: US 7,328,290 B2
(45) Date of Patent: Feb. 5, 2008

(54) SYSTEM AND METHOD OF AUTOMATICALLY SWITCHING CONTROL OF A BUS IN A PROCESSOR-BASED DEVICE

(75) Inventors: Kevin B. Leigh, Houston, TX (US); Tuan A. Pham, Sugar Land, TX (US); Jason W. Whiteman, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1341 days.

(21) Appl. No.: 09/872,600

(22) Filed: Jun. 1, 2001

(65) Prior Publication Data

US 2004/0225816 A1   Nov. 11, 2004

(51) Int. Cl.
*G06F 13/00* (2006.01)
(52) U.S. Cl. ............................. 710/104; 710/100
(58) Field of Classification Search ........ 710/305–306, 710/100, 104, 240–244; 361/718–727, 760, 361/781
See application file for complete search history.

(56) References Cited

U.S. PATENT DOCUMENTS

| | | | |
|---|---|---|---|
| 5,706,447 A * | 1/1998 | Vivio | 362/30 |
| 5,812,751 A | 9/1998 | Ekrot et al. | 395/182.02 |
| 6,061,754 A | 5/2000 | Cepulis et al. | 710/126 |
| 6,072,943 A * | 6/2000 | Gasparik et al. | 716/2 |
| 6,097,218 A * | 8/2000 | Callicott et al. | 326/82 |
| 6,128,682 A * | 10/2000 | Humpherys et al. | 710/301 |
| 6,363,452 B1 * | 3/2002 | Lach | 710/316 |
| 6,519,669 B1 * | 2/2003 | Yanagisawa | 710/304 |
| 6,567,877 B1 * | 5/2003 | Lewis et al. | 710/305 |
| 6,601,125 B1 * | 7/2003 | Campbell | 710/305 |
| 6,633,935 B1 * | 10/2003 | Chan et al. | 710/100 |
| 6,701,402 B1 * | 3/2004 | Alexander et al. | 710/305 |
| 2004/0225811 A1 * | 11/2004 | Fosler | 710/305 |

* cited by examiner

*Primary Examiner*—Mark H. Rinehart
*Assistant Examiner*—Kim T. Huynh

(57) ABSTRACT

A system and method of automatically switching control of a bus in a processor-based device is provided. In a server, control of a bus is automatically switched from a controller mounted on the system board to a controller located on an optional expansion card upon connection of the expansion card to the system board. Automatic switching includes isolating the on-board controller from the bus and appropriately terminating any transmission line ends on the bus resulting from the establishment of the alternative control path.

55 Claims, 6 Drawing Sheets

SYSTEM AND METHOD OF AUTOMATICALLY SWITCHING CONTROL OF A BUS IN A PROCESSOR-BASED DEVICE

BACKGROUND OF THE INVENTION

1. Field of the Invention

The present invention relates generally to processor-based devices and, more particularly, to a system and method of automatically switching control of a bus in a processor-based device.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Currently, many processor-based devices, such as servers, are being designed in smaller, more compact packages. Size restraints are particularly evident in the server market, where data centers having fixed physical space continually require higher computing capacity. Thus, in many data centers, older and larger servers are being replaced with smaller, low profile servers which can increase computing capacity without requiring the center to expand its physical facility. For example, current designs of low profile servers (e.g., 1U servers), which have a reduced height between the base and top of the chassis (e.g., less than 1.75 inches), may replace older, higher profile servers which are stacked vertically in a rack system at a ratio of three low profile servers for every older server (e.g., a 3U server). Provided each server is adequately cooled, the servers may be stacked, such that the replacement ratio of low profile servers to older servers may be maximized.

The reduced height of the low profile chassis for the servers and the compact packaging may create problems with providing adequate airflow to cool the components within the chassis sufficiently. Thus, physical designs of low profile servers are concerned with provision of adequate heatsinking and placement of components to ensure unobstructed airflow paths.

Exemplary components which often present an obstacle to airflow include cables used to interconnect components (e.g., hard drives) to a chassis-mounted printed circuit board (e.g., the motherboard) or to interconnect multiple boards. For example, the motherboard may include expansion connectors which allow additional boards, such as peripheral controller cards, SCSI controller cards, and so forth, to be added to the server. If such interconnecting cables obstruct airflow, then the heated air can recirculate inside the chassis and, consequently, can cause overheating of certain components or even the entire system.

The use of cables within the chassis may be difficult to eliminate altogether, particularly for server designs which provide for versatility in the choice of components that may be used or added. For example, although the motherboard of the server typically may include a SCSI controller for controlling the SCSI device (e.g., hard drives) connected to the SCSI controller, many end-users may desire incorporation of alternate SCSI controller cards which provide different or additional features. Use of alternate SCSI controller cards also may enable the user to ensure uniformity among all servers the user may have, regardless of the system manufacturer. Such a SCSI controller card may be connected to one or more SCSI devices via a SCSI adapter cable having one end connected to the controller card and the other end connected to the SCSI devices. When using a SCSI adapter, the existing connection between the motherboard and the SCSI devices must be decoupled. Placement of a SCSI cable in the server chassis, however, may obstruct airflow due to the low profile of the chassis and the unpredictability of the positioning of the cable, especially after an installation or a service event.

To avoid the complications associated with such a SCSI cable, it would be desirable to maintain the physical connection between the motherboard and the SCSI devices and connect the new SCSI controller card to the motherboard via an expansion port. Either a direct connection or a relatively fixed-position cable could be provided to make the connection between the motherboard and the SCSI controller card. However, such an arrangement introduces other complications, including provision of appropriate signal termination of electrical transmission line ends on the SCSI bus on the motherboard that are present due to the provision of alternate electrical signal paths to different controllers. Appropriate termination may be needed to prevent signal degradation due to signal reflections from the bus ends. Moreover, it would be desirable to provide a feature by which the server, including components on the motherboard, can be made aware of which SCSI controller (e.g., the on-board controller or the expansion controller) has control of the SCSI bus.

The present invention may be directed to one or more of the problems set forth above.

BRIEF DESCRIPTION OF THE DRAWINGS

The foregoing and other advantages of the invention will become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
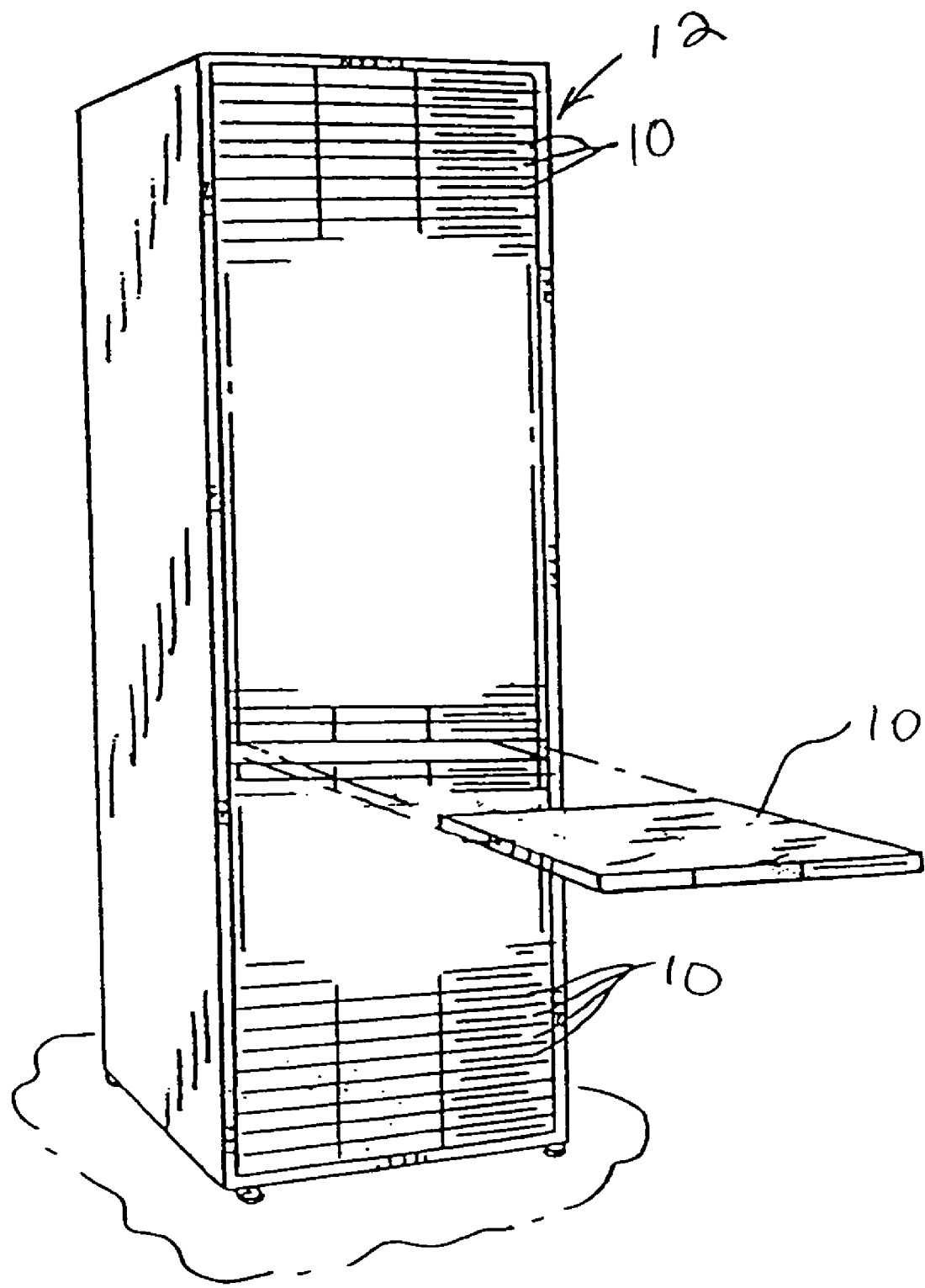
FIG. 1 is a perspective view of a rack with a plurality of processor-based devices, e.g., servers, mounted therein.

Turning now to the drawings, and referring generally to FIG. 1, an exemplary application in which a low profile processor-based device, such as a server, is illustrated. As shown, a plurality of densely packaged, low profile processor-based devices 10 are slidably mounted in a rack system 12. The rack system 12 may include retractable rails that permit each device 10 to be moved between a retracted position within the rack system 12 and an extended position in which the device 10 is at least partially extended from the rack system 12. The slidable mounting arrangement facilitates removal or servicing of an individual device 10.

Throughout this description, an exemplary processor-based device will be described and referenced as a server 10. However, it should be understood that other devices, such as desktop computers, tower servers, etc., may benefit from the unique features described herein. The exemplary server 10 is a low profile server, such as a 1U server configured to occupy one unit of vertical space (e.g., 1.75 inches) in the rack system 12.

Figure 2:
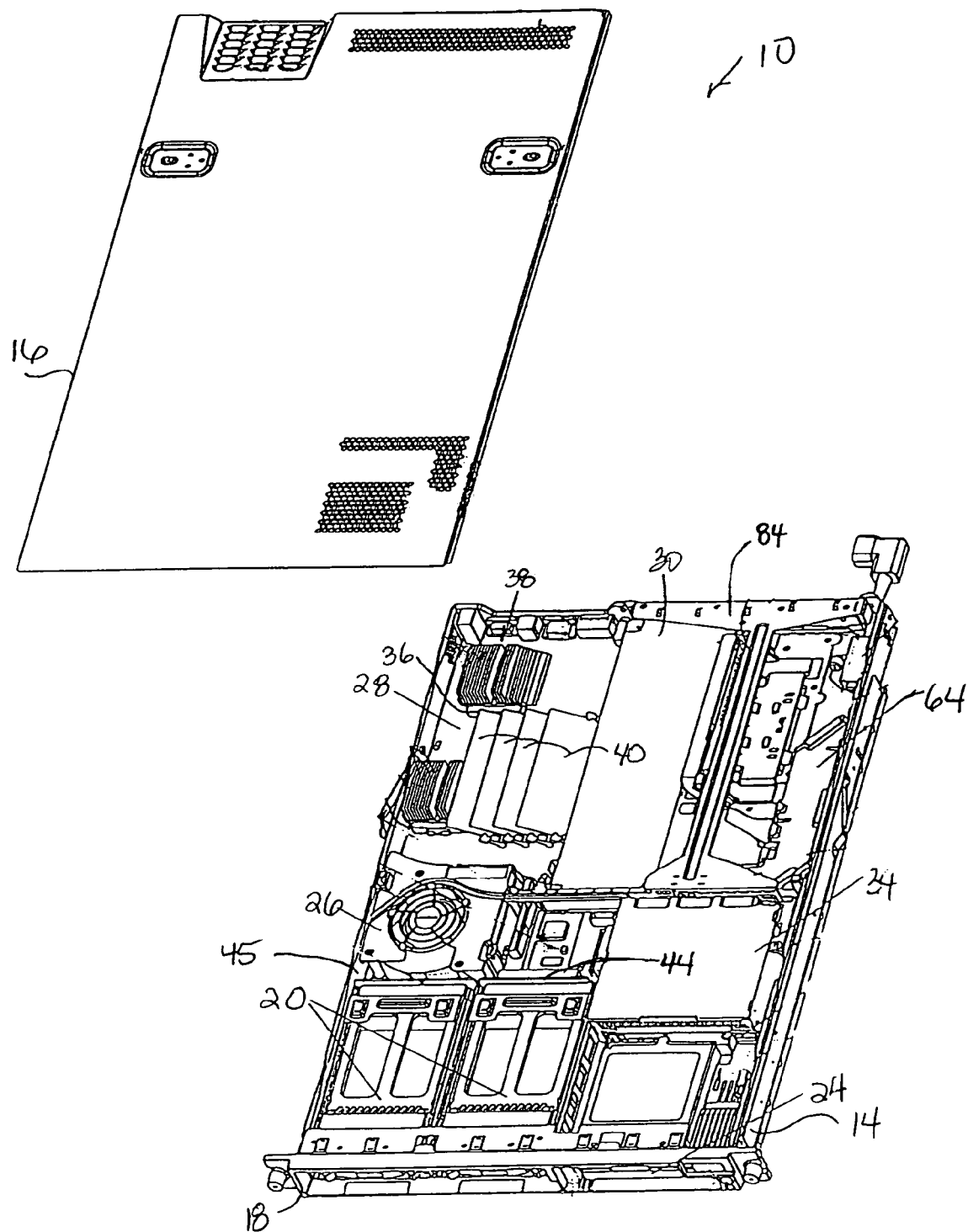
FIG. 2 is a partially exploded perspective view of the server illustrating a low profile server that may be mounted in the rack shown in FIG. 1.

The server 10 includes a chassis 14 and a cover 16. FIG. 2 illustrates an exploded view of the server 10 showing the cover 16 removed from the chassis 14. The chassis includes a front 18 with openings into a pair of drive bays 20. The drive bays 20 are configured to receive a pair of SCSI devices, e.g., hard drives 22 (not shown in FIG. 2). The chassis 14 further includes appropriate mounting arrangements for retaining other server components, such as an ejectable CD drive/floppy drive assembly 24, a blower fan assembly 26, a motherboard or system board 28, a PCI card 30, an expansion card 32 (not shown in FIG. 2) (e.g., a SCSI controller card), a power supply 34, etc. Components mounted on the motherboard 28 include one or more central processing units 36 (each coupled to a corresponding heat sink 38, a Northbridge and memory controller ASIC 39 (not shown)) a plurality of memory modules 40 (e.g., DIMMS), and a RAID on chip (ROC) SCSI controller 42 (not visible in FIG. 2). The ROC 42 is electrically coupled to a SCSI bus to control the pair of SCSI devices 22, which are coupled to the motherboard 28 via a SCSI back plane connector 44.

Figure 3:
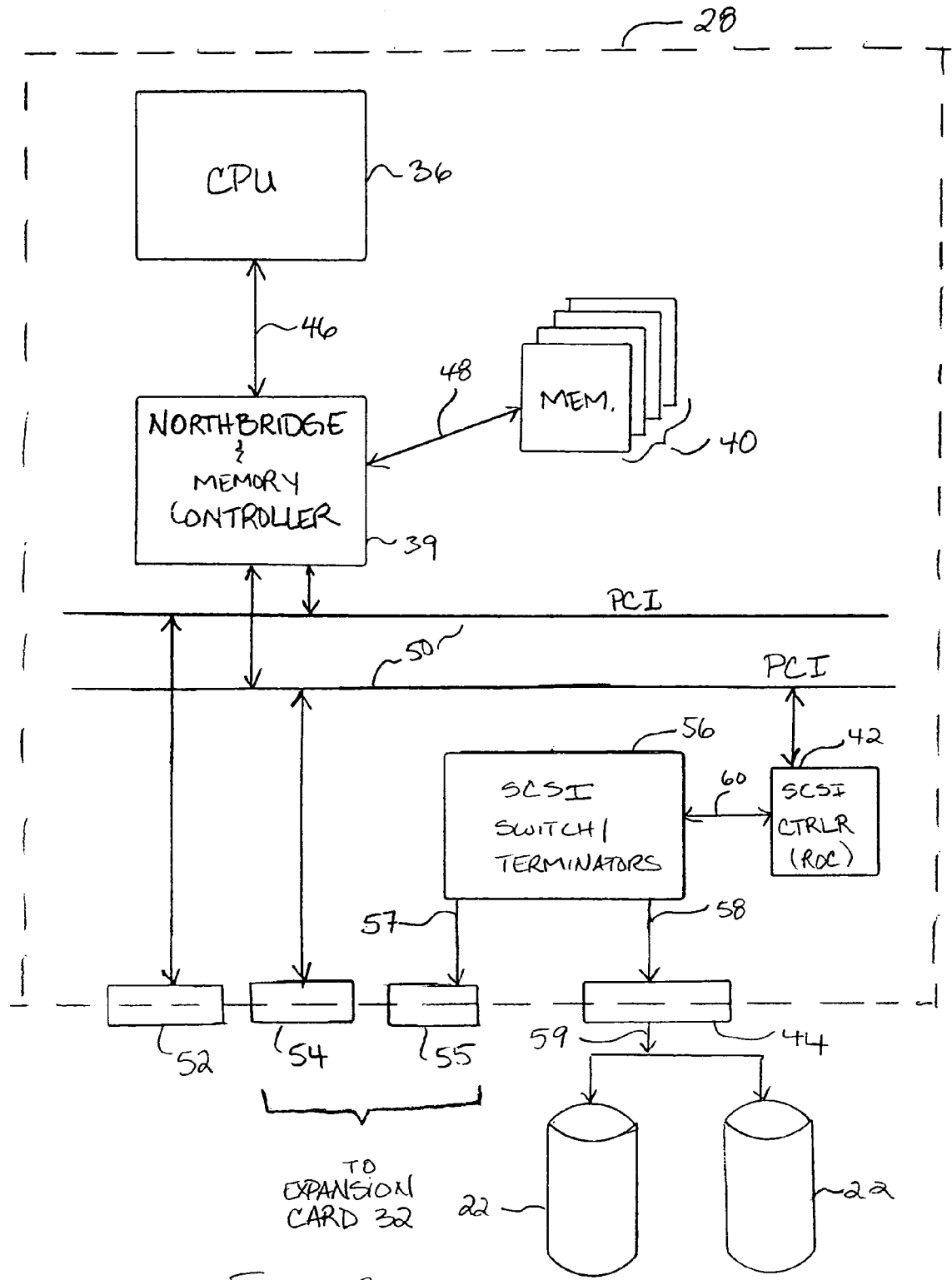
FIG. 3 is a block diagram of exemplary components and buses included on a motherboard in the server of FIG. 2.

With reference to FIG. 3, an electrical schematic block diagram illustrating the exemplary components of a portion of the system 10 is provided. In the embodiment shown, the motherboard 28 includes one or more central processing units (CPU) 36 and the Northbridge 39, which are coupled to a host bus 46. The Northbridge 39 includes a memory controller which controls access to the memory modules 40 coupled to a memory bus 48. The Northbridge 39 also provides the interface between the host bus 46 and one or more input/output buses 50, such as a peripheral component interface (PCI) bus. A plurality of I/O ports 52 and 54 may be coupled to the I/O bus(es) 50 such that various types of peripheral devices may be connected to the server 10. In the exemplary embodiment, one of the I/O ports 54 is configured for connecting the motherboard to an expansion card 32 (e.g., a SCSI controller card). Further, the motherboard 28 includes an expansion port connector 55 for connecting to the expansion card 32, as will be described in further detail below.

In FIG. 3, the I/O ports 52 and 54 are illustrated as being disposed on the motherboard 28. However, in alternative embodiments, the I/O ports 52 and 54 may be located off of the motherboard 28, but coupled to the motherboard 28 by other means, such as by a backplane.

The on-board SCSI controller (or ROC) 42 is coupled to the I/O bus 50 as the primary means to interface to the SCSI devices 22. In the embodiment illustrated, to enable the user of the server IO to install an alternative SCSI expansion card 32 via the I/O port 54 and the expansion port connector 55, the SCSI controller 42 is coupled to a SCSI switch/terminator module 56. The SCSI switch/terminator module 56 includes appropriate switches and termination devices to switch control of the SCSI devices 22 automatically from the ROC controller 42 to a SCSI controller on the expansion card 32 whenever the expansion card 32 is connected to the expansion port 55 (e.g., by an appropriate cable, a connector, etc.). The termination devices in the switch/terminator module 56 provide appropriate termination for ends on SCSI bus segments 57, 58, or 60 to prevent degradation of signals as a result of signal reflections due to mismatched transmission line impedances.

Figure 4:
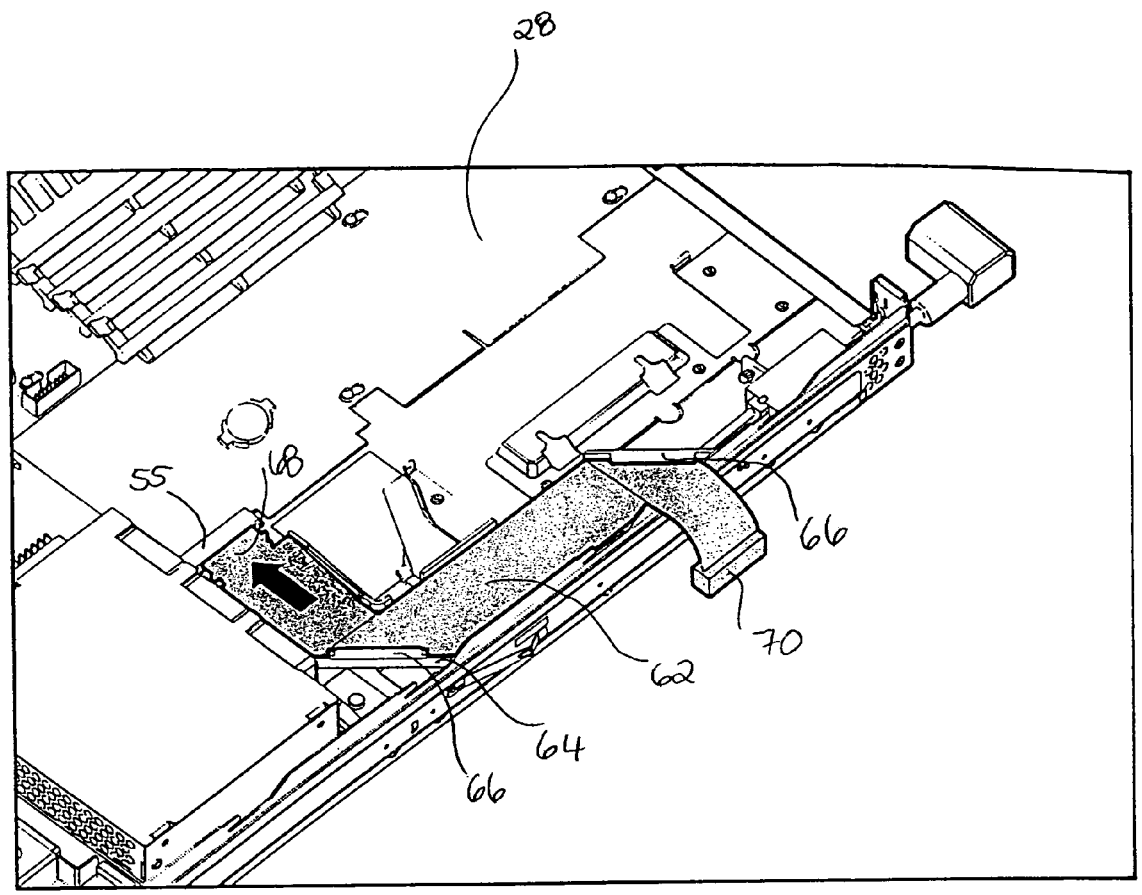
FIG. 4 is a partial perspective view of the server of FIG. 2, illustrating the positioning of an expansion cable within the server.

In the exemplary embodiment illustrated in FIGS. 2-5, the expansion card 32 is coupled to the I/O port 54 via a connector, and to the expansion port 55 via a flat expansion cable 62. To prevent the cable 62 from interfering with airflow through the low profile server 10, the chassis 14 includes a cable tray 64 for retaining the cable 62. As illustrated in FIG. 4, the tray 64 includes a flat base with a plurality of projecting tabs 66 that extend over and retain the flat cable 62. One end of the cable 62 terminates in a connector 68 and the other end of the cable 62 terminates in a connector 70. The connector 68 is configured to engage the expansion port connector 55 on the motherboard 28, as depicted by the arrow in FIG. 4. The connector 70 is configured to engage with the expansion card 32, as illustrated by the arrow in FIG. 5.

Figure 5:
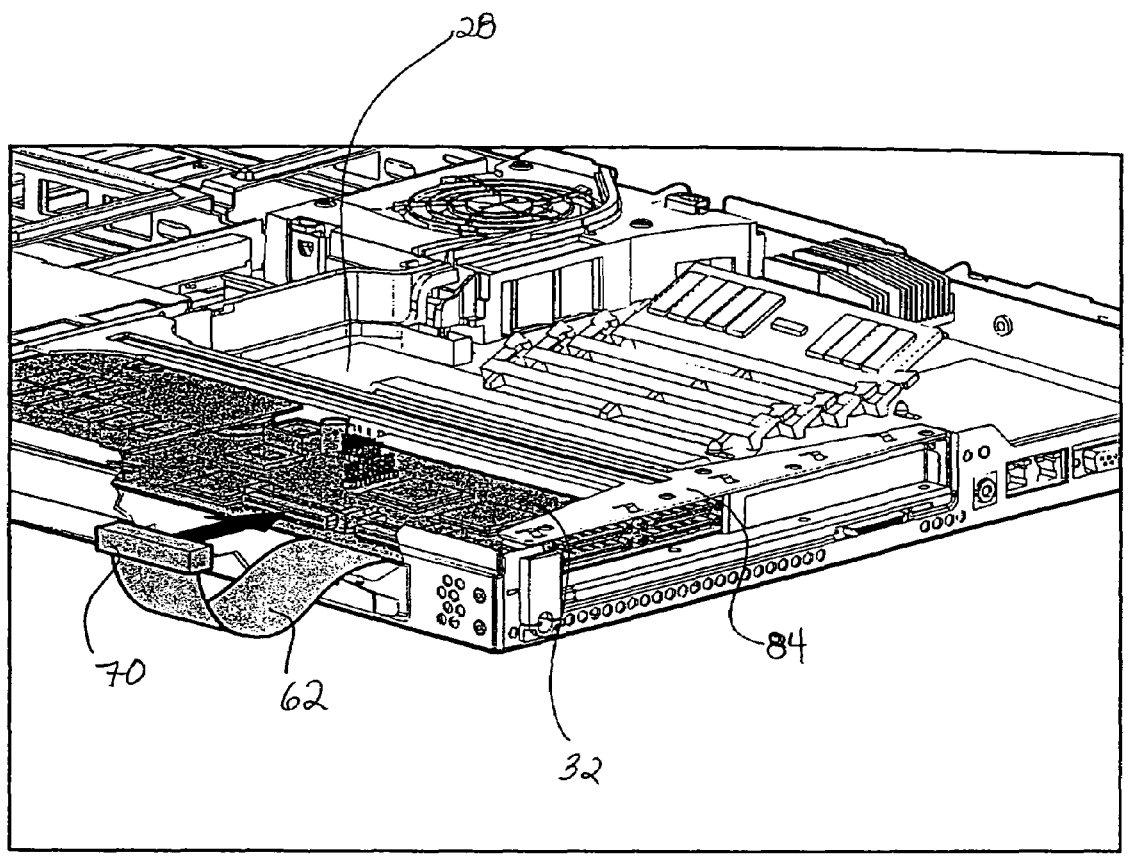
FIG. 5 is a partial perspective view of the server of FIG. 2, illustrating the positioning of an expansion board for connecting to the expansion cable of FIG. 4.

Referring to FIGS. 2 and 5, the expansion card 32 is seated in a cavity above the cable tray 64 and the flat cable 62 and is retained in an appropriate manner, such as by the card bracket assembly 84. In the exemplary embodiment illustrated, the expansion card 32 is a SCSI controller card configured to control the SCSI devices 22. As will be explained in detail below, when the expansion card 32 is connected to the motherboard 28 via the flat cable 62, the ROC 42 on the motherboard 28 is automatically isolated from the SCSI bus such that the expansion card 32 will assume control of the SCSI devices 22.

Figure 6:
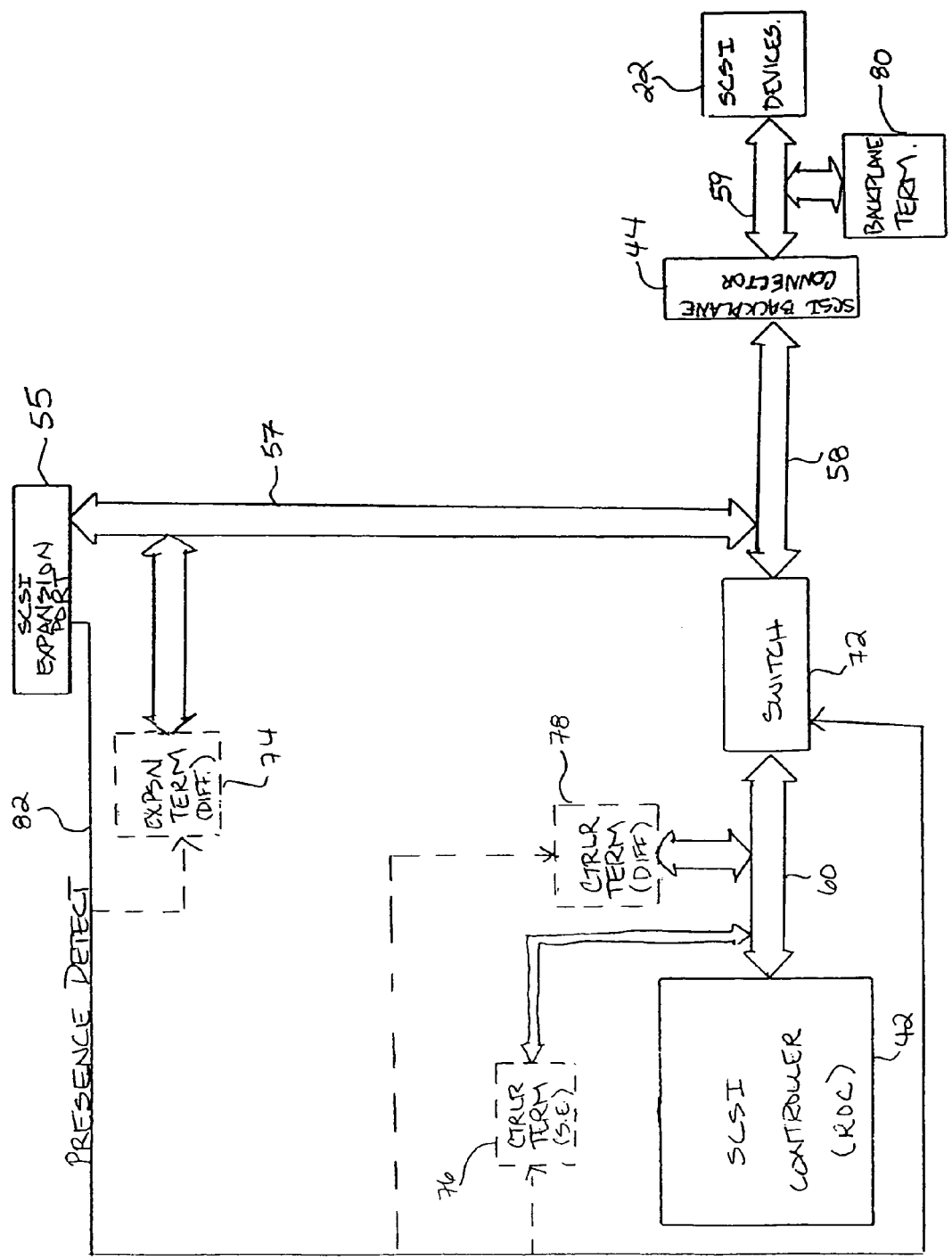
FIG. 6 is an electrical schematic block diagram illustrating components which enable automatic switching of control of a SCSI bus in accordance with the invention.

FIG. 6 is an electrical schematic block diagram illustrating the signal flow and the components in the system 10 for providing automatic switching of control of the SCSI bus. In the exemplary embodiment, such components include a SCSI bus switch 72, a SCSI expansion terminator 74, SCSI controller terminator 76 or 78, and a SCSI backplane terminator 80. When a SCSI expansion card 32 is connected to the expansion port 55 via the expansion cable 62, a signal 82 is asserted indicating that the presence of the expansion board 32 has been detected. For example, the presence detect signal 82 may be asserted by connecting one of the pins of connector 70 to a ground or a logical LOW signal on the expansion board 32. The presence detect signal 82 is provided through the cable 62 to the SCSI switch 72 and optionally to the terminators 74, 76, and 78. In response to the presence detect signal 82, the SCSI switch 72 and the terminators 74, 76, and 78 may change state to switch control of and terminate the SCSI bus, as appropriate.

In FIG. 6, the SCSI expansion terminator 74 and the controller terminators 76 and 78 and their connections to the SCSI bus segments 57 and 60, respectively, are illustrated in dashed lines 20 to indicate that these terminators are optional based on the physical layout of the SCSI bus segments 57 and 60 on the motherboard 28. Further, the provision of the presence detect signal 82 to the terminators 74, 76, and 78 is illustrated in dashed lines to indicate that if the terminators 74, 76, and 78 are included in the layout, they always may be in a state in which they are coupled to the SCSI bus, regardless of whether the expansion board 32 is connected to the motherboard 28. The desirability of selectively coupling the terminators 74, 76, and 78 to the SCSI bus segments 57 and 60 again may be dependent on the physical layout of the SCSI bus on the motherboard 28.

Terminators 74, 76, 78, and 80 are conventional terminators to reduce signal degradation on a bus due to signal reflections from segments or stubs having a trace length which exceeds a predetermined limit. In one embodiment, the SCSI bus employs differential signaling and, thus, differential terminators terminate each end of a bus segment to which an active device (e.g., a SCSI controller, a SCSI device, etc.) is attached. An exemplary differential terminator that may be used is a UCC5638 available from Texas Instruments.

If used, the controller terminator 76 may be a single-ended terminator to provide appropriate termination for certain control signal lines on the ROC 42, thus preventing improper operation or malfunction of the operating system due to inquiries from other applications to the SCSI bus through the ROC 42 when isolated from the SCSI bus segment 58. An exemplary single-ended terminator is a UCC5606 available from Texas Instruments.

In one embodiment, the expansion terminator 74 and the controller terminator 76 or 78 are physically disposed on the motherboard. The backplane terminator 80 is physically disposed behind the backplane connector 44 on a SCSI backplane board 45 (see FIG. 2). Further, the backplane terminator 80 is coupled to the SCSI bus segment 59. It should be understood, however, that the physical location of the terminators may be different in other applications and will be based on the actual physical layout of the processor-based device 10, the traces which comprise the SCSI bus, and the physical locations of the on-board controller 42, the switch 72, the expansion port 55, etc.

The switch 72 for isolating the ROC 42 from the SCSI bus segment 58 includes multiple electronic switches (e.g., 20-bit low impedance transistor devices referenced as part number FST 16210 available from Fairchild Semiconductor). When a SCSI expansion card 32 is not connected to the expansion port 55, the switch 72 couples the on-board SCSI controller (ROC) 42 to the SCSI backplane connector 44 via the SCSI bus segments 60 and 58. In this mode of operation, one end of the SCSI bus segment 57 is terminated by the differential expansion terminator 74 disposed proximate the expansion port 55.

When the SCSI expansion card 32 is connected to the expansion port 55, the presence detect signal 82 is asserted, which causes the switch 72 to decouple the on-board SCSI controller (ROC) 42 from the SCSI bus segment 58. In this mode of operation, the expansion terminator 74 (if used) is decoupled from the SCSI bus segment 57 in response to the presence detect signal 82, since the expansion card 32 itself provides adequate termination. In certain embodiments, the controller terminator 78 may be eliminated if the channel of the ROC 42 that is connected to SCSI bus segment 60 is "turned off." For example, in response to detection of an expansion card 32 connected to the expansion port 55, other circuitry in the system 10 may disable attempts to access the SCSI bus through the ROC 42. Thus, by turning off the ROC 42 when the expansion board 32 is connected, any noise or stray signals that may be present on the un-terminated bus segment 60 will be ignored.

Further, in the mode in which the expansion card 32 is connected, and even if differential data signals on the bus segment 60 are not terminated by the differential controller terminator 78, it may be desirable to terminate certain of the control lines in the bus segment 60 with the single-ended controller terminator 76 to prevent improper operation of the operating system when the ROC 42 is decoupled from the SCSI bus. Regardless of whether the single-ended terminator 76 or the differential terminator 78 is used, either terminator 76 or 78 may be selectively coupled to the SCSI bus segment 60 in response to the presence detect signal 82, or may remain coupled regardless of whether an expansion board 32 is connected to the SCSI expansion port 55.

In embodiments in which the trace length between the switch 72 and the SCSI expansion port 55 (i.e., SCSI bus segment 57) is relatively short such that signal reflections from the segment 57 do not substantially degrade signals on the SCSI bus segment 60 when the expansion board 32 is not connected, then the expansion terminator 74 may be eliminated. For example, in an embodiment in which the SCSI bus has a clock frequency of approximately 40 MHz, it has been observed that the expansion terminator 74 may be eliminated if SCSI bus segment 57 has a trace length of less than 0.5 inch and the controller terminator 78 is used.

TABLES I-III summarize the states of the various terminators and the switch in three exemplary applications in which switching of control of a SCSI bus between an on-board controller 42 and an expansion controller on an expansion card 32 is employed. The first column of each table indicates whether the expansion board 32 is connected to the expansion port 55. The second column indicates the state (i.e., coupled/decoupled from bus segment 57) of the expansion terminator 74, if used in the application. The third column indicates the state (i.e., coupled/decoupled from bus segment 59) of the backplane terminator 80. The fourth column indicates the state (i.e., coupled/decoupled from bus segment 60) of the controller terminators 76 and 78, if used. Finally, the fifth column indicates the state of the switch 72.

Further, TABLE I represents an embodiment in which the single-ended terminator 76 terminates the ROC 42, and the differential terminator 78 is not used. TABLE II represents another embodiment in which the differential terminator 78 terminates the ROC 42, and the single-ended terminator 76 is not used. TABLE III represents yet another embodiment in which neither the expansion terminator 74 nor the single-ended terminator 76 is used.

TABLE I

| Expansion board 32 connected? | Expansion Terminator 74 | Backplane Terminator 80 | Controller Terminators 76 and 78 | Switch 72 |
| --- | --- | --- | --- | --- |
| YES | DECOUPLED from bus segment 57 in response to presence detect signal 82 | COUPLED to SCSI bus segment 59 | Single-ended (76): COUPLED to control lines of ROC 42 in response to presence detect signal 82 Differential (78): not needed | Isolates ROC 42 from SCSI bus 58 in response to presence detect signal 82 |

TABLE I-continued

| Expansion board 32 connected? | Expansion Terminator 74 | Backplane Terminator 80 | Controller Terminators 76 and 78 | Switch 72 |
|---|---|---|---|---|
| NO | COUPLED to bus segment 57 | COUPLED to SCSI bus segment 59 | Single-ended (76): DECOUPLED from control lines of ROC 42 Differential (78): not needed | Couples ROC 42 to SCSI bus 58 |

TABLE II

| Expansion board 32 connected? | Expansion Terminator 74 | Backplane Terminator 80 | Controller Terminators 76 and 78 | Switch 72 |
|---|---|---|---|---|
| YES | DECOUPLED from bus segment 57 in response to presence detect signal 82 | COUPLED to SCSI bus segment 59 | Single-ended (76): not needed Differential (78): COUPLED to bus segment 60 in response to presence detect signal 82 | Isolates terminated ROC 42 from SCSI bus 58 in response to presence detect signal 82 |
| NO | COUPLED to bus segment 57 | COUPLED to SCSI bus segment 59 | Single-ended (76): not needed Differential (78): DECOUPLED from bus segment 60 | Couples ROC 42 to SCSI bus 58 |

TABLE III

| Expansion board 32 connected? | Expansion Terminator 74 | Backplane Terminator 80 | Controller Terminators 76 and 78 | Switch 72 |
|---|---|---|---|---|
| YES | Not needed. | COUPLED to SCSI bus segment 59 | Single-ended (76): not needed Differential (78): COUPLED to bus segment 60; trace length between ROC 42 and terminator 78 is less than 0.5 inch. | Isolates terminated ROC 42 from SCSI bus 58 in response to presence detect signal 82 |
| NO | Not needed if trace length between switch 72 and expansion port 54 (i.e., bus segment 57) is less than 0.5 inch | COUPLED to SCSI bus segment 59 | Single-ended (76): not needed Differential (78): COUPLED to bus segment 60 | Couples ROC 42 to SCSI bus 58 |

It should be understood that the embodiments represented in TABLES I-III are exemplary only and that other combinations of terminators, states of terminators, and trace lengths may be used. Further, although the foregoing embodiments also have been described with respect to a cable which connects the expansion card to the motherboard, it should be understood that the expansion board may be connected to the motherboard by other means, such as a connector which engages a connector edge of the motherboard.

Still further, although the foregoing embodiments have been described with reference to a SCSI bus, it should be understood that other types of communication media (e.g., buses or point-to-point interconnects) are contemplated in applications in which multiple mutually exclusive devices (e.g., controllers, peripheral devices, processing nodes, etc.) can be selected for connection to the communication medium. Thus, for example, the foregoing description may be applied in a system including a point-to-point interconnect that supports selective switching between any two or more mutually exclusive devices that can interface to the interconnect.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of switching control of a bus in a processor-based device, the method comprising the acts of:
   electrically coupling a first bus controller to the bus;
   generating a detection signal indicative of coupling of a second bus controller to the bus; and
   automatically isolating the first bus controller from the bus in response to the detection signal.

2. The method as recited in claim 1, comprising the act of terminating the first bus controller.

3. The method as recited in claim 2, wherein the first bus controller is terminated in response to detection of the detection signal.

4. The method as recited in claim 1, wherein the bus comprises a plurality of traces disposed on a substrate, wherein the first bus controller is electrically coupled to a first segment of the plurality of traces, and wherein the second bus controller is electrically coupled to a second segment of the plurality of traces.

5. The method as recited in claim 4, comprising the act of terminating the second segment of the plurality of traces.

6. The method as recited in claim 5, comprising the act of electrically removing termination of the second segment of the plurality of traces in response to detection of the second bus controller.

7. The method as recited in claim 1, wherein the first bus controller is disposed on a first substrate, and the second controller is disposed on a second substrate, the second substrate being coupled to the first substrate, and wherein the act of generating a detection signal comprises the act of transmitting the detection signal from the second substrate to the first substrate.

8. The method as recited in claim 7, wherein the first substrate comprises an expansion port, and a first end of the cable is connected to the expansion port.

9. The method as recited in claim 1, wherein the bus comprises a SCSI bus.

10. The method as recited in claim 7, wherein the first substrate and the second substrate each comprise a printed circuit board.

11. The method as recited in claim 7, wherein the first substrate and the second substrate are disposed within a low profile server.

12. The method as recited in claim 1, wherein the act of electrically coupling comprises the act of coupling the first bus controller to the bus using a switch.

13. A method of switching control of a bus in a processor-based device, the processor-based device comprising a first bus controller and a bus disposed on a first substrate, wherein the first bus controller is coupled to the bus and configured to control the bus, the method comprising the acts of:
electrically coupling a second bus controller to the bus;
detecting presence of the second bus controller; and
automatically switching control of the bus from the first bus controller to the second bus controller in response to detecting the presence of the second bus controller.

14. The method as recited in claim 13, wherein the act of detecting the presence of the second bus controller comprises the act of generating a detect signal when the second bus controller is electrically coupled to the bus.

15. The method as recited in claim 13, wherein the act of automatically switching control of the bus comprises the acts of:
isolating the first bus controller from the bus; and
terminating the isolated first bus controller.

16. The method as recited in claim 13, comprising the act of terminating the bus proximate the first bus controller.

17. The method as recited in claim 14, wherein the bus is terminated proximate the first bus controller in response to detecting the presence of the second bus controller.

18. The method as recited in claim 15, wherein the second bus controller is disposed on a second substrate coupled to the first substrate.

19. The method as recited in claim 18, wherein the first substrate comprises an expansion port, and the method comprises the act of terminating the bus proximate the expansion port.

20. The method as recited in claim 19, comprising the act of removing termination of the bus proximate the expansion port in response to detecting the presence of the second bus controller.

21. A method of switching control of a bus in a low profile server, the low profile server comprising a first bus controller, a bus, and an isolation device, wherein the first bus controller is configured to control the bus, and wherein the isolation device is configured to isolate the first bus controller from the bus, the method comprising the act of:
connecting a second bus controller to the bus to cause the isolation device to isolate the first bus controller from the bus.

22. The method as recited in claim 21, wherein the first bus controller is disposed on a first substrate, and wherein the second bus controller is disposed on a second substrate, and the act of connecting the second bus controller to the bus comprises the acts of:
disposing a cable in the low profile server, the cable comprising a first end and a second end;
connecting the first end of the cable to the first substrate; and
connecting the second end of the cable to the second substrate.

23. A processor-based device, comprising:
a processor;
a memory coupled to the processor; and
a first substrate, comprising:
a bus disposed on the first substrate;
a first bus controller disposed on the first substrate, the first bus controller being coupled to the processor and to the bus; and
an isolation device disposed on the first substrate, the isolation device being configured to couple the first bus controller to the bus, and to automatically isolate the first bus controller from the bus in response to detection of a second bus controller coupled to the bus.

24. The device as recited in claim 23, comprising an expansion port disposed on the first substrate and coupled to the bus, wherein the expansion port is connectable to a second substrate, and wherein the second bus controller is disposed on the second substrate.

25. The device as recited in claim 23, wherein the second bus controller is disposed on a second substrate, and the device comprises a cable having a first end and a second end, the first end being connectable to the first substrate, and the second end being connectable to the second substrate.

26. The device as recited in claim 24, comprising a termination device disposed on the first substrate, the termination device being configured to terminate the bus proximate the expansion port when the second bus controller is not coupled to the bus.

27. The device as recited in claim 23, comprising a termination device disposed on the first substrate, the termination device being configured to terminate the bus proximate the first bus controller in response to detection of the second bus controller.

28. The device as recited in claim 23, wherein the isolation device comprises an electronic switch.

29. The device as recited in claim 28, wherein the electronic switch comprises a transistor.

30. The device as recited in claim 23, wherein the processor and the memory are disposed on the first substrate.

31. The device as recited in claim 23, wherein the bus comprises a SCSI bus.

32. The device as recited in claim 31, comprising a SCSI device connectable to the SCSI bus.

33. The device as recited in claim 32, wherein the SCSI device comprises a hard disk drive.

34. The device as recited in claim 23, wherein the device comprises a low profile server.

35. A printed circuit board for a low profile server, the system board comprising:
a substrate;
a bus disposed on the substrate;
a first bus controller disposed on the substrate, the first bus controller coupled to the bus and configured to control the bus; and
an isolation device disposed on the substrate and configured to automatically isolate the first bus controller from the bus in response to detection of a second bus controller coupled to the bus.

36. The board as recited in claim 35, comprising a termination device disposed on the substrate and configured to terminate the first bus controller in response to detection of the second bus controller coupled to the bus.

37. The board as recited in claim 35, comprising an expansion port disposed on the substrate and coupled to the bus, wherein the second bus controller is coupled to the bus via the expansion port.

38. The board as recited in claim 37, comprising a termination device disposed on the substrate and configured to terminate the bus proximate the expansion port when the second bus controller is not coupled to the bus via the expansion port.

39. The board as recited in claim 35, wherein the isolation device comprises an electronic switch.

40. The board as recited in claim 39, wherein the electronic switch comprises a transistor.

41. The printed circuit board as recited in claim 35, comprising:
   a memory disposed on the substrate; and
   a processor disposed on the substrate, the processor being coupled to the memory and to the first bus controller.

42. The printed circuit board as recited in claim 35, wherein a SCSI device is coupled to the bus, the SCSI device being controllable by the first bus controller or the second bus controller.

43. The printed circuit board as recited in claim 42, wherein the SCSI device comprises a hard disk drive.

44. A method of manufacturing a device for switching control of a bus in a processor-based device, the method comprising the acts of:
   providing a bus disposed on a substrate;
   connecting an expansion port to the bus, the expansion port being configured for connection to a second bus controller;
   disposing an isolation device on the substrate, the isolation device being connected to the bus; and
   disposing a first bus controller on the substrate, the first bus controller being connected to the isolation device, the isolation device being configured to isolate the first bus controller from the bus when a second bus controller is connected to the expansion port.

45. The method as recited in claim 44, comprising the act of:
   disposing a termination device on the substrate, the termination device being connected to the bus.

46. The method as recited in claim 45, wherein the termination device is connected to the bus proximate the first bus controller.

47. The method as recited in claim 46, wherein the termination device is configured to terminate the first bus controller when the second bus controller is connected to the expansion port.

48. The method as recited in claim 45, wherein the termination device is connected to the bus proximate the expansion port.

49. The method as recited in claim 48, wherein the termination device is configured to terminate the bus proximate the expansion port when the second bus controller is not connected to the expansion port.

50. The method as recited in claim 44, wherein the bus comprises a SCSI bus.

51. The method as recited in claim 44, wherein the first bus controller comprises a SCSI bus controller.

52. A method of manufacturing an expansion card connectable to a system controller board having a system bus controller configured to control the bus, and having an isolation device, the method comprising the acts of:
   disposing an expansion bus controller on a substrate, the expansion bus controller being configured to control a bus;
   disposing a detect signal generator on the substrate;
   connecting the detect signal generator to the first expansion connector; and
   disposing a first expansion connector on the substrate, the first expansion connector connected to the expansion bus controller and the detect signal generator,
   wherein the first expansion connector is configured to couple with a cable, the cable having a first end connectable to the first expansion connector and a second end connectable to a system controller board,
   wherein the detect signal generator is configured to generate a detect signal detectable at the second end of the cable when the expansion board is connected to the system board via the cable, and
   wherein the isolation device is configured to isolate the system bus controller from the bus in response to the detect signal.

53. A method of switching between a first device and a second device connectable to a communications medium in a processor-based device, the method comprising the acts of:
   electrically coupling a first device to the communications medium;
   generating a detection signal indicative of coupling of a second device to the communications medium; and
   automatically isolating the first device from the communications medium in response to the detection signal.

54. The method as recited in claim 53, wherein the communications medium comprises a point-to-point interconnect.

55. The method as recited in claim 53, wherein the communications medium comprises shared bus.

* * * * *

UNITED STATES PATENT AND TRADEMARK OFFICE
CERTIFICATE OF CORRECTION

| | | |
|---|---|---|
| PATENT NO. | : 7,328,290 B2 | Page 1 of 1 |
| APPLICATION NO. | : 09/872600 | |
| DATED | : February 5, 2008 | |
| INVENTOR(S) | : Kevin B. Leigh et al. | |

It is certified that error appears in the above-identified patent and that said Letters Patent is hereby corrected as shown below:

In column 4, line 4, delete "IO" and insert -- 10 --, therefor.

In column 4, line 65, after "lines" delete "20".

Signed and Sealed this

Tenth Day of June, 2008

JON W. DUDAS
*Director of the United States Patent and Trademark Office*